United States Patent
Yang et al.

(10) Patent No.: US 8,682,907 B1
(45) Date of Patent: Mar. 25, 2014

(54) EVALUATION OF SUBSTITUTE TERMS

(75) Inventors: Ke Yang, Cupertino, CA (US); Zachary A. Garrett, Tokyo (JP); Daisuke Ikeda, Tokyo (JP)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/436,744

(22) Filed: Mar. 30, 2012

(51) Int. Cl.
*G06F 7/02* (2006.01)
*G06F 17/30* (2006.01)

(52) U.S. Cl.
USPC ........... 707/750; 707/706; 707/759; 707/765; 707/767

(58) Field of Classification Search
None
See application file for complete search history.

(56) References Cited

U.S. PATENT DOCUMENTS

| | | | |
|---|---|---|---|
| 7,856,441 B1 * | 12/2010 | Kraft et al. | 707/758 |
| 8,086,620 B2 * | 12/2011 | Parikh et al. | 707/765 |
| 2009/0198684 A1 * | 8/2009 | Collins et al. | 707/5 |

\* cited by examiner

*Primary Examiner* — Bruce Moser
(74) *Attorney, Agent, or Firm* — Fish & Richardson P.C.

(57) ABSTRACT

Methods, systems, and apparatus, including computer programs encoded on computer storage media, for evaluating substitute terms. One of the methods includes selecting a first term and a second term. A first co-occurrence frequency is determined for co-occurring terms in search queries that include the first term. A first vector is generated for the first term using the first co-occurrence frequencies. A second co-occurrence frequency is determined for the co-occurring terms in the search queries that include the first term adjacent to the second term. A second vector is generated for the second term using the second co-occurrence frequencies. A score for the second term as a context for a substitution rule based on the first term is computed, wherein the score is based on a comparison between the first vector and the second vector.

36 Claims, 7 Drawing Sheets

Context evaluated: (:music), for sheer → sheet

Queries

| | sheer (:music) | | sheer | | delta | sheet |
|---|---|---|---|---|---|---|
| instrument sheer music | 1.2 | | 0.7 | | 0.5 | instrument |
| store for sheer music | 1.25 | | 0.8 | | 0.45 | store |
| sheer music lessons | 0.9 | | 0.6 | | 0.3 | lessons |
| piano sheer music | 0.95 | = | 0.75 | — | 0.2 | piano |
| sheer curtains | 0.6 | | 0.7 | | -0.1 | curtain |
| deck sheer | 0.15 | | 0.35 | | -0.2 | fabric |
| sheer fabric | 0.4 | | 0.8 | | -0.4 | deck |
| sheer clothing | 0.3 | | 0.9 | | -0.6 | clothing |

402 — 404 — 406 — 408

} 410 More Importance

∴ sheer (:music) is a good context

Context evaluated: (the:), for train → bus

Queries

| | train (the:) | | train | | delta | bus |
|---|---|---|---|---|---|---|
| take the train | 0.4 | | 0.1 | | 0.3 | take |
| where is the train | 0.7 | | 0.45 | | 0.25 | where |
| how do i get the train | 0.4 | | 0.18 | | 0.22 | how |
| when is the train | 0.8 | = | 0.59 | — | 0.21 | when |
| train schedule | 0.28 | | 0.3 | | -0.02 | schedule |
| routes for train | 0.55 | | 0.6 | | -0.05 | routes |
| train station | 0.36 | | 0.5 | | -0.14 | station |
| train platform | 0.23 | | 0.4 | | -0.17 | platform |

412 — 414 — 416 — 418

} 420 Less Importance

∴ train (the:) is a <u>bad</u> context

FIG. 4

EVALUATION OF SUBSTITUTE TERMS

BACKGROUND

This specification generally relates to search engines, and one particular implementation relates to evaluating substitute terms or substitution rules that are used in revising search queries.

To identify documents that are responsive to search queries, a search engine may match query terms, or substitute terms of the query terms, with terms that occur in the documents, or with terms that occur in metadata associated with the documents.

SUMMARY

Search systems use query revision engines to revise search queries, for example to include substitute terms of query terms. To identify a substitute term of a query term, query revisers evaluate candidate substitute terms according to various criteria, such as criteria that estimate whether, in a particular context, a candidate substitute term is a good substitution of the query term. "Goodness" of a particular candidate substitute term may be expressed, for example, by the amount of confidence, trust, consistency, reliability, or other characteristic that defines an association between a query term and the candidate substitute term.

One particular indicator of how good a particular candidate substitute term is for an original query term is to compare co-occurrence frequencies for terms that co-occur with the original term and with the candidate substitute term in search queries. The comparison can be performed by constructing a first vector of co-occurrence frequencies of terms that co-occur with the original term in search queries, and by constructing a second vector of co-occurrence frequencies of terms that co-occur with the candidate substitute term in search queries. A measure of similarity between the first vector and the second vector can be an indicator of how good the candidate substitute term is as a substitution for the original term.

Co-occurrence frequencies can also be used to evaluate the usefulness of contexts associated with substitution rules. A search system can construct a first vector of co-occurrence frequencies of terms that co-occur with an original term and a second vector of co-occurrence frequencies of terms that co-occur with the original term in a particular query context. The search system can compute a difference between the vectors and evaluate the importance of co-occurring terms with the biggest co-occurrence frequency differences between the first and second vectors. Good contexts tend to have more meaningful words having the biggest co-occurrence frequency differences, and bad contexts tend to have less meaningful words with the biggest co-occurrence frequency differences.

In general, one innovative aspect of the subject matter described in this specification can be embodied in methods that include the actions of selecting a first term and a second term; determining, for each of one or more first co-occurring terms that occur in past search queries that include the first term, a first co-occurrence frequency of the co-occurring term in search queries that include the first term; generating a first vector for the first term using the first co-occurrence frequencies; determining, for each of one or more second co-occurring terms that occur in past search queries that include the first term adjacent to the second term, a second co-occurrence frequency of the co-occurring term in the search queries that include the first term adjacent to the second term; generating a second vector for the second term using the second co-occurrence frequencies; comparing the first vector and the second vector; and computing a score for the second term as a context for a substitution rule based on the first term, wherein the score is based on a comparison between the first vector and the second vector. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Computing a score for the second term comprises computing a change in co-occurrence frequency between corresponding elements of the first vector and the second vector; and evaluating the importance of one or more terms that correspond to the most significant changes in co-occurrence frequency. The score increases as the importance of the one or more terms increases. Computing a score for the second term comprises computing a weighted sum of the changes in co-occurrence frequencies for the one or terms having the most significant changes in co-occurrence frequency, wherein each change in co-occurrence frequency is weighted by the importance of the corresponding term. The score satisfies:

$$\text{score} = \sum_{i=1}^{N} V_i \cdot imp(\text{Term}_i),$$

wherein $V_i$ is a change in co-occurrence frequency $\text{Term}_i$ is a term corresponding to the change in co-occurrence frequency, and $imp(\text{Term}_i)$ is an importance of $\text{Term}_i$. The importance score for a term x is based on frequencies of terms that co-occur with the term in received search queries, and is given by:

$$imp(x) = 1 - \sum_{i=1}^{k} H_i \cdot DF(\text{Term}_i),$$

wherein $H_i$ is a co-occurrence frequency value for $\text{Term}_i$ and $DF(\text{Term}_i)$ is a document frequency value of $\text{Term}_i$. The importance score of a term is an inverse document frequency of the term. The importance score of a term is computed by determining terms that co-occur with the term in received search queries; computing an inverse document frequency of each term that co-occurs with the term in received search queries; computing the importance score based at least in part on a sum of the computed inverse document frequency of each term that co-occurs with the term in received search queries. Designating the context as a bad context comprises adding the context to a stop list of bad contexts. The actions further include providing the stop list to a query revision process that will ignore substitution rules that depend on bad contexts in the stop list. The first term and the second term occur in a substitution rule that specifies a query revision that applies when the first term occurs adjacent to the second term. The actions further include determining that the score satisfies a threshold; and designating the second term as a bad context for the first term in response to determining that the score satisfies a threshold.

Particular embodiments of the subject matter described in this specification can be implemented so as to realize one or more of the following advantages. Vector similarity using co-occurrence frequencies provides a useful signal for evaluating substitute terms. Eliminating bad contexts from a substitution engine makes statistics calculation faster by eliminating data collection for unhelpful contexts, which also makes the size of the data smaller. Additionally, removing bad contexts improves substitution rule accuracy, as bad contexts may introduce unreliable or spurious substitute terms or incorrectly indicate that a substitute term is a bad substitute term.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a diagram of evaluating query contexts using vectors.

Like reference numbers and designations in the various drawings indicate like elements.

DETAILED DESCRIPTION

Figure 1:
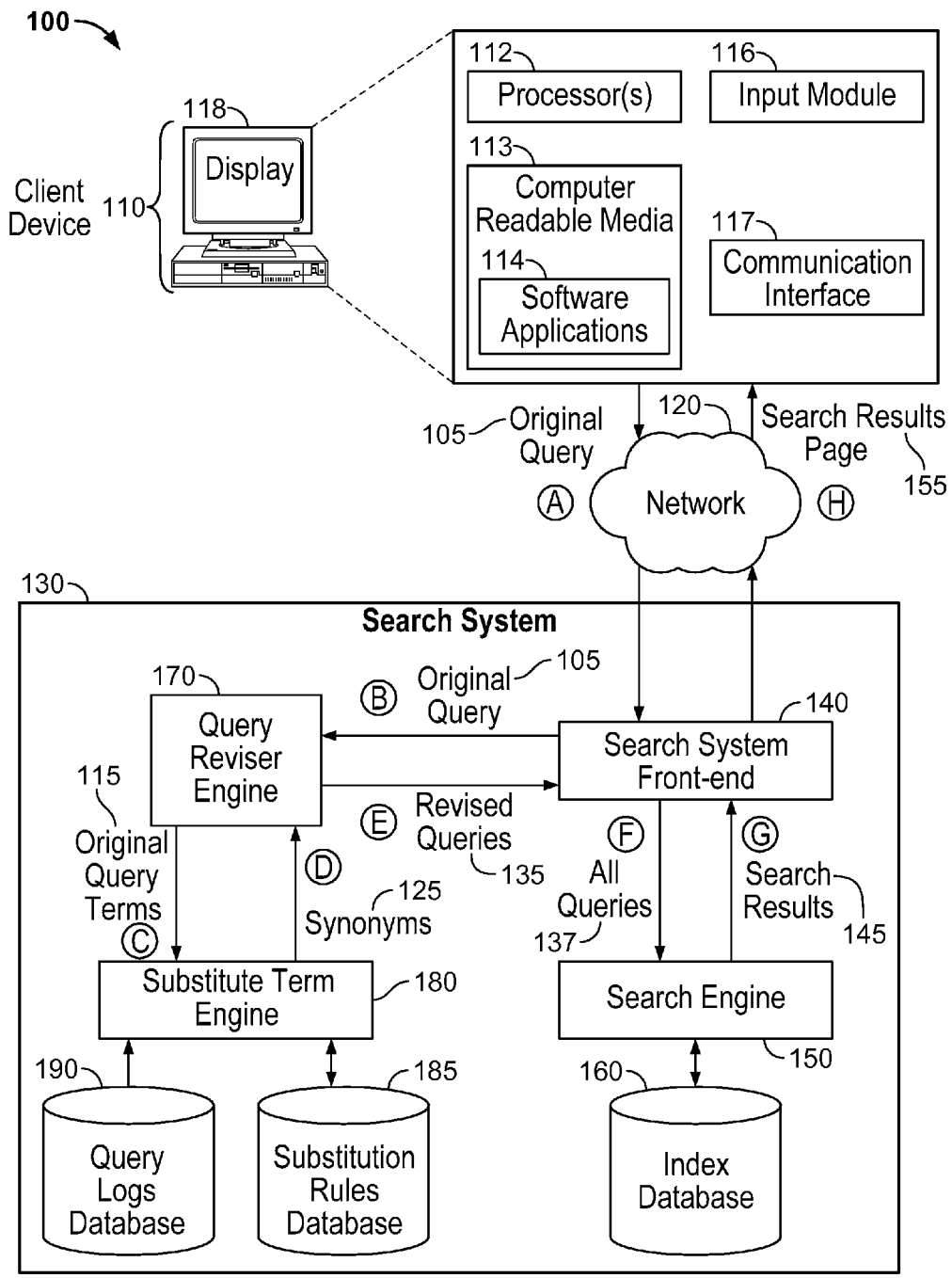
FIG. 1 is a block diagram illustrating an example system that can revise queries using substitute terms.

FIG. 1 is a diagram of an example system 100 that can revise queries using substitute terms. In general, the system 100 includes a client device 110 coupled to a search system 130 over a network 120. The search system 130 includes a search engine 150, a query reviser engine 170, and a substitute term engine 180. The search system 130 receives a query 105, referred to by this specification as the "original search query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original search query 105. The search system 130 can generate or obtain other queries in numerous ways, e.g., by revising the original search query 105.

In some implementations, the search system 130 can generate a revised search query by adding to the original search query 105 additional terms that are substitute terms of one or more terms that occur in the original search query 105. In other implementations, the search system 130 can generate a revised search query by substituting terms that are substitute terms of terms that occur in the original search query 105, in place of the terms in the original search query 105. As used by this specification, "substitute terms," or other terms used to generate revised search queries, can also be referred to as a "synonyms." Additionally, a "substitution rule" can also be referred to as a "synonym rule." The substitute term engine 180 can determine the additional terms that are candidate substitute terms for the one or more terms that occur in the original search query. The query reviser engine 170 can generate the revised search query. The search engine 150 can use the original search query 105 and the revised queries to identify and rank search results. The search engine 150 can provide the identified search results 145 to the client device 110 on the search results page 155.

The substitute term engine 180 can identify the substitute terms that the query reviser engine 170 can use to generate revised queries by evaluating terms included in previously received queries stored in a query logs database 190. The queries stored in the query logs database 190 can include previous queries in which a user considered the results of the queries desirable. For example, the user can click the provided search results from a query, in effect, validating the search results. The queries stored in the query logs database 190 can include previous queries determined to provide desirable results by the search system 130. For example, the search system 130 can perform a quality thresholding for returned search results from a query. The quality thresholding can include determining search results that have historically been returned for a particular query, and filtering those results that do not satisfy predetermined quality criteria. Search results above the quality threshold can validate a query, which the search system 130 can then include in the query logs database 190.

Given a first term ("cat"), the substitute term engine 180 can evaluate terms ("feline" or "banana") that are candidate substitute terms for the original term. In addition, the substitute term engine 180 can designate certain terms as substitute terms of the first term (as in the case of "feline"), and can designate other terms as not substitute terms of the first term (as in the case of "banana"). The substitute term engine 180 can base these determinations on rules stored in a substitution rules database 185. Two example substitution rules can be that "feline" is a substitute term for "cat" and "banana" is not a substitute term for "cat".

The search system 130 can define substitution rules to apply generally, or to apply only when particular conditions, or "query contexts," are satisfied. For example, the query context of a substitution rule can specify one or more other terms that should be present in the query for the substitution rule to apply. Furthermore, query contexts can specify relative locations for the other terms (e.g., to the right or left of a query term under evaluation). In another example, query contexts can specify a general location (e.g., anywhere in the query). For example, a particular substitution rule can specify that the term "pet" is a substitute term for the query term "dog," but only when the query term "dog" is followed by the term "food" in the query. Multiple distinct substitution rules can generate the same substitute term for a given query term. For example, for the query term "dog" in the query "dog food," the term "pet" can be designated as a substitute term for "dog" by both a substitution rule for "dog" in the general context as well as a substitution rule for "dog" when followed by "food."

Whether substitution rules apply can depend on other terms in the original search query 105. In other words, a substitution rule need not apply in all situations. For example, when the term "cats" is used as a single-term query, the term "felines" can be considered a substitute term for "cats". The substitute term engine 180 can return the term "felines" to the query reviser engine 170 to generate a revised search query. In another example, when the query includes the term "cats" followed by the term "musical," a substitution rule can specify that the term "felines" is not a substitute term for "cats." In some implementations, the substitution rules can be stored in the substitution rules database 185 for use by the substitute term engine 180, the query reviser engine 170, or the search engine 150.

In the illustrative example of FIG. 1, the search system 130 can be implemented as computer programs installed on one or more computers in one or more locations that are coupled to each other through a network (e.g., network 120). The search system 130 includes a search system front end 140 (e.g., a "gateway server") that coordinates requests between other parts of the search system 130 and the client device 110. The search system 130 also includes one or more "engines": the search engine 150, a query reviser engine 170, and the substitute term engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitute term engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original search query 105 from the client device 110. The search system front-end 140 routes the original search query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original search query terms 115 for the original search query 105, and the client device 110 communicates the original search query 105 to the search system 130 over the network 120. For example, the user can submit the original search query 105 by initiating a search dialogue on the client device 110, speaking or typing the original search query terms 115 of the original search query 105, and then pressing a search initiation button or control on the client device 110. The client device 110 formulates the original search query 105 (e.g., by specifying search parameters). The client device 110 transmits the original search query 105 over the network 120 to the search system 130.

Although this specification refers to the query 105 as an "original" or an "initial" query, such reference is merely intended to distinguish this query from other queries, such as the revised queries that are described below. The designation of the original search query 105 as "original" is not intended to require the original search query 105 to be the first query that is entered by the user, or to be a query that is manually entered. For example, the original search query 105 can be the second or subsequent query entered by the user. In another example, the original search query 105 can be automatically derived (e.g., by the query reviser engine 170). In another example, the original search query 105 can be modified based on prior queries entered by the user, location information, and the like.

During state (B), the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query by adding terms to the original search query 105 using substitute terms 125 for terms in the original search query 105. In other implementations, the query reviser engine 170 generates a revised search query by substituting the substitute terms 125 for the corresponding terms of the original search query 105. The query reviser engine 170 can obtain substitute terms 125 for use in revising the original search query 105 from the substitute term engine 180.

During state (C), the query reviser engine 170 communicates original search query terms 115 of the original search query 105 to the substitute term engine 180. The substitute term engine 180 can use substitution rules included in the substitution rules database 185 to determine one or more substitute terms 125 for one or more of the original search query terms 115 of the original search query 105.

The substitute term engine 180 communicates substitute terms 125 to the query reviser engine 170 during state (D). The query reviser engine 170 generates one or more revised queries 135 by adding substitute terms 125 to the original search query 105. In addition, the query reviser engine 170 can generate one or more revised queries 135 by substituting certain terms of the original search query 105.

The query reviser engine 170 communicates the one or more revised queries 135 to the search system front-end 140 during state (E). The search system front-end 140 communicates the original search query 105 along with the one or more revised queries 135 to the search engine 150 as all queries 137 during state (F). The search engine 150 generates search results 145 that it identifies as being responsive to the original search query 105 and/or the one or more revised queries 135. The search engine 150 can identify search results 145 for each query using an index 160 that stores indexed documents (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original search query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original search query terms 115 of the original search query 105 in a query box (or "search box"), located, for example, on the top of the search results page 155. In addition, the client device 110 can display the search results 145 in a search results box, for example, located on the left-hand side of the search results page 155.

Figure 2A:
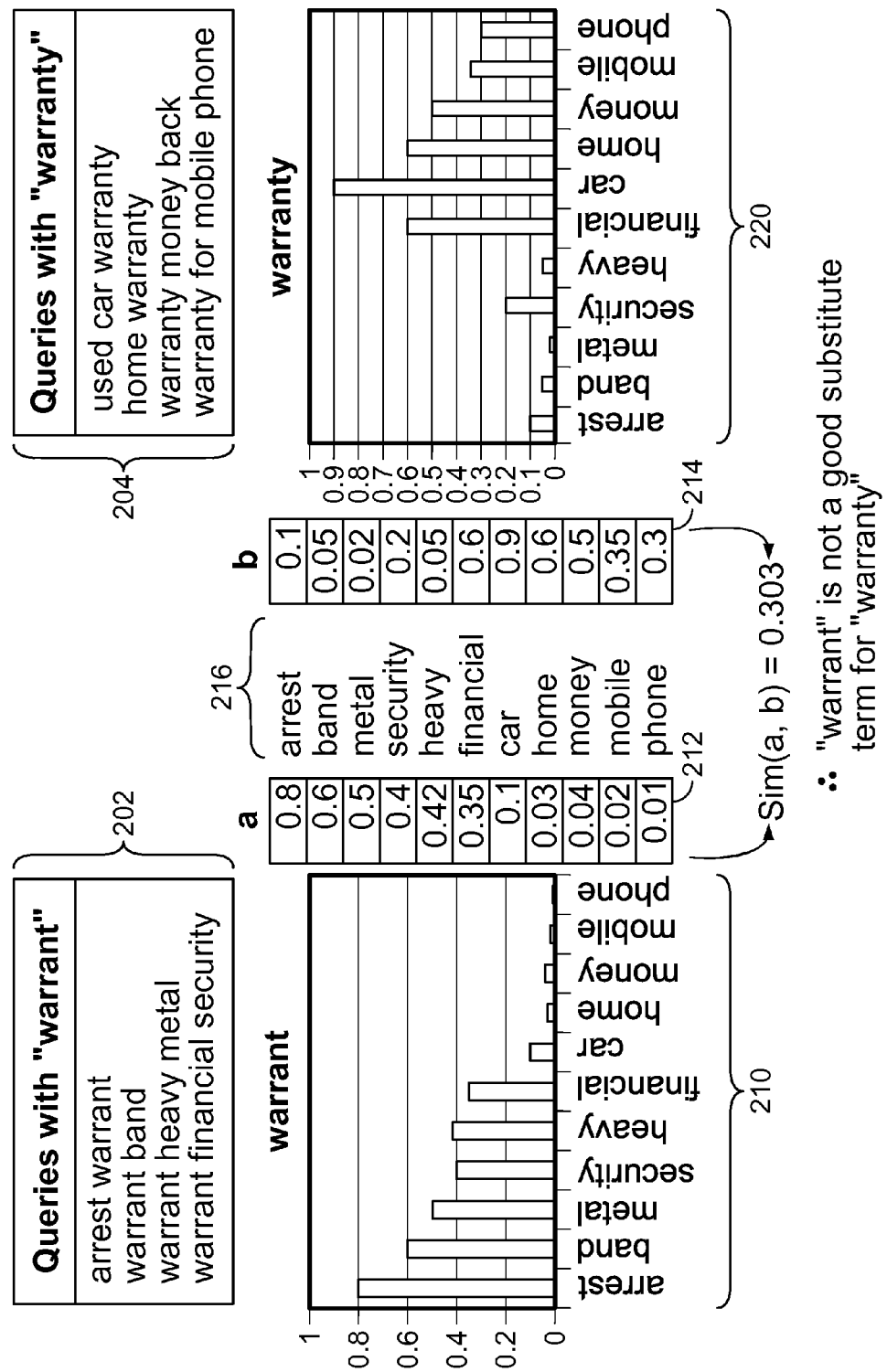
FIGS. 2A and 2B are diagrams that illustrate the evaluation of substitution rules using vectors.
Figure 2B:
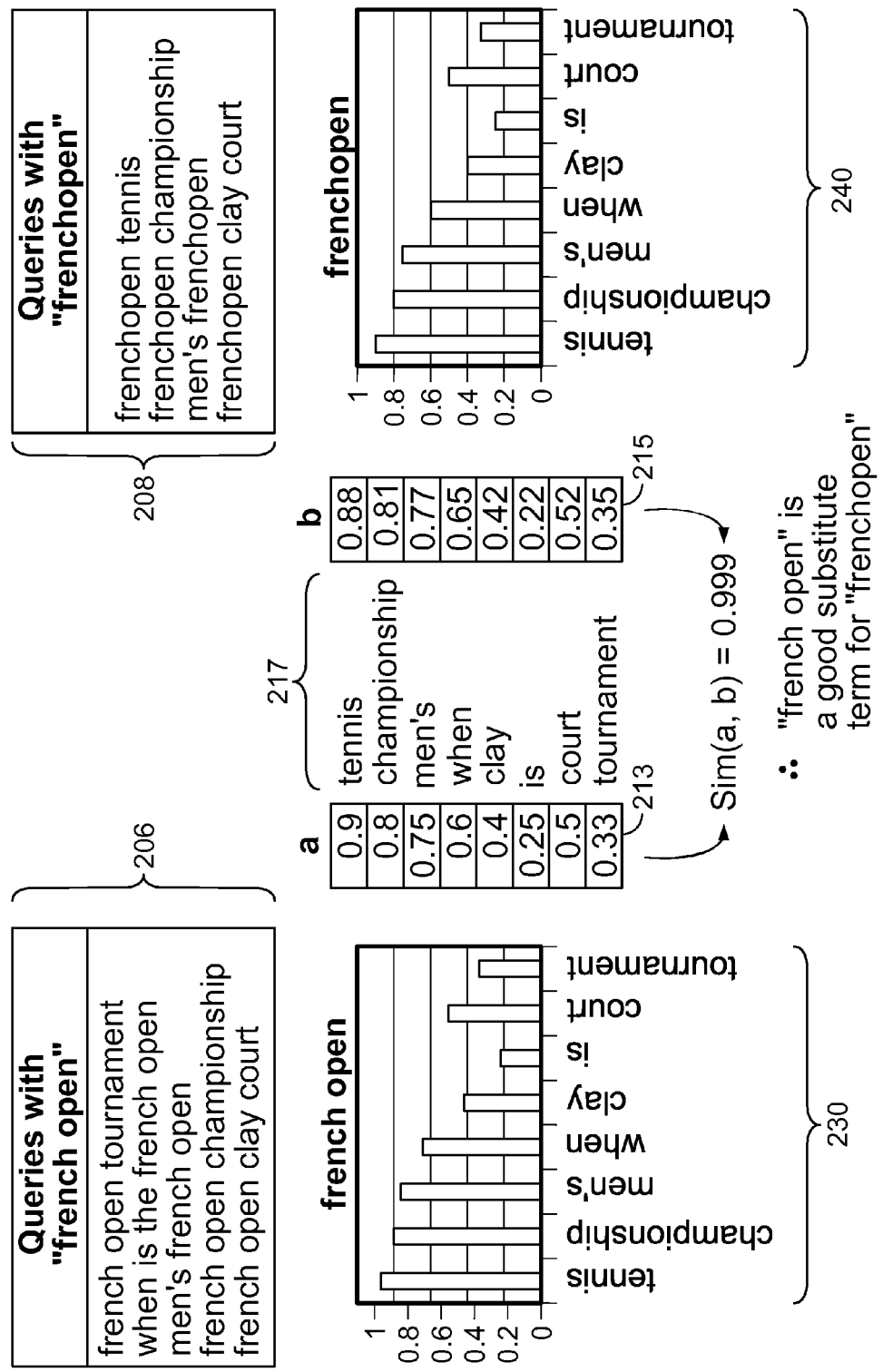

FIGS. 2A and 2B are diagrams that illustrate the evaluation of substitution rules using vectors. A search system can evaluate, for example using substitute term engine 180, an original term and a candidate substitute term by populating vectors with co-occurrence frequencies of other terms that co-occurred with each in previously received search queries. The co-occurrence frequencies can be obtained from other sources as well, including terms co-occurring in sentences or paragraphs of books, web pages, or other publications. The search system can then evaluate the candidate substitute term by comparing the populated vectors. In general, a higher degree of similarity between the vectors can indicate that the candidate substitute term is an appropriate substitution for the original term, and a lower degree of similarity between the vectors can indicate that the candidate substitute term is not an appropriate substitution for the original term.

In FIG. 2A, the search system evaluates a candidate substitute term, "warrant," for an original term "warranty" using vectors. For a number of received search queries that include either the candidate substitute term, e.g. "warrant," or the original term, e.g. "warranty," the search system can compute statistics of terms 216 that co-occur in the received search queries to build vectors 212 and 214. The system can for example compute statistics based on received search queries stored in query logs database 190.

Example received search queries 202 include the candidate substitute term "warrant," and example queries 204 include the original term "warranty." The search system can generate a vector 212 for the candidate substitute term. The system can generate vector 212 by adding an element corresponding to each term that co-occurred in search queries with the original term or with the candidate substitute term. The values of the vector 212 can be co-occurrence frequencies of terms that co-occurred in received search queries with the candidate substitute term, "warrant." The values of some elements may be zero, e.g. if a particular term co-occurred with the original term and not the substitute term, or vice versa. In some implementations, the system does not add vector elements for common "stop words," e.g. "is," "the," or "a," that have an overall frequency that meets a particular threshold.

Similarly, the search system can generate a vector 214 for the original term that has elements corresponding to each term that co-occurred in search queries with the original term or with the candidate substitute term. The search system can populate the values of the vector 214 with co-occurrence frequencies of terms that co-occurred in received search queries with the original term, "warranty." The elements of vector 212 and 214 that correspond to the same term can be located at the same position in each vector. For example, the elements corresponding to "arrest" are located at the first vector element in vector 212 and vector 214. The populated vectors can be represented by histograms 210 and 212 that illustrate the different frequencies of co-occurring terms.

The search system can compare the vectors 212 and 214 using any appropriate vector comparison method to determine whether the candidate substitute term "warrant" is an appropriate substitution for the original term "warranty." For example, the search system can compute a similarity score using a cosine similarity between the two vectors 212 and 214 and use the similarity score as a measure of quality for the substitute term. In some implementations, the search system compares the computed similarity to a threshold. If the similarity satisfies a threshold, e.g. 0.5, 0.9, 0.99, the search system can determine that the candidate substitute term is an appropriate substitution for the original term. Similarly, if the similarity score is satisfies a threshold, the search system can increase a confidence score associated with a particular substitution rule. In some other implementations, the search system can compute a confidence score for the substitute term directly from the similarity score. Alternatively, if the similarity does not satisfy a threshold, the search system can determine that the candidate substitute term is not an appropriate substitution for the original term or can decrease a confidence score associated with a particular substitution rule.

In FIG. 2A, the search system can determine that the computed similarity measure between the two vectors 212 and 214, 0.303, does not satisfy a threshold. In other words, the vector 212 is not similar enough to the vector 214. The vector similarity measure revealed that even though "warrant" and "warranty" share a stem, the co-occurrence frequencies of terms that co-occur with each term differ significantly. Significantly differing co-occurring terms can indicate that the terms have significantly different meanings, and that therefore, "warrant" is not an appropriate substitution for "warranty."

In FIG. 2B, the search system evaluates a candidate substitute term "French open" for an original term "Frenchopen" using vectors. For a number of received queries that include either the candidate substitute term, e.g. "French open," or the original term, e.g. "Frenchopen," the search system can compute statistics of terms 217 that co-occur in the received search queries in vectors 213 and 215.

Example received search queries 206 include the candidate substitute term "French open," and example received search queries 208 include the original term "Frenchopen." Vector 213 is populated with co-occurrence frequencies of terms that co-occur with the candidate substitute term "French open." Similarly, vector 215 is populated with co-occurrence frequencies of terms the co-occur with the original term "Frenchopen." The populated vectors can be represented by histograms 230 and 240 that illustrate the similarities in the co-occurrence frequencies of the co-occurring terms.

The search system can compare the vectors 213 and 215, using cosine similarity, for example, to determine whether the candidate substitute term "French open" is an appropriate substitution for the original term "Frenchopen." In FIG. 2B, the search system can determine that the computed similarity measure between the two vectors 213 and 215, 0.999, satisfies a threshold. The vector similarity measure revealed that the other terms co-occur with both the candidate substitute term and the original term with similar co-occurrence frequencies, which can indicate that the candidate substitute term is an appropriate substitution for the original term. In response, the search system can designate the candidate substitute term as a substitute term for the original term, or increase a confidence value associated with a corresponding substitution rule for substituting "French open" for "Frenchopen."

Figure 3:
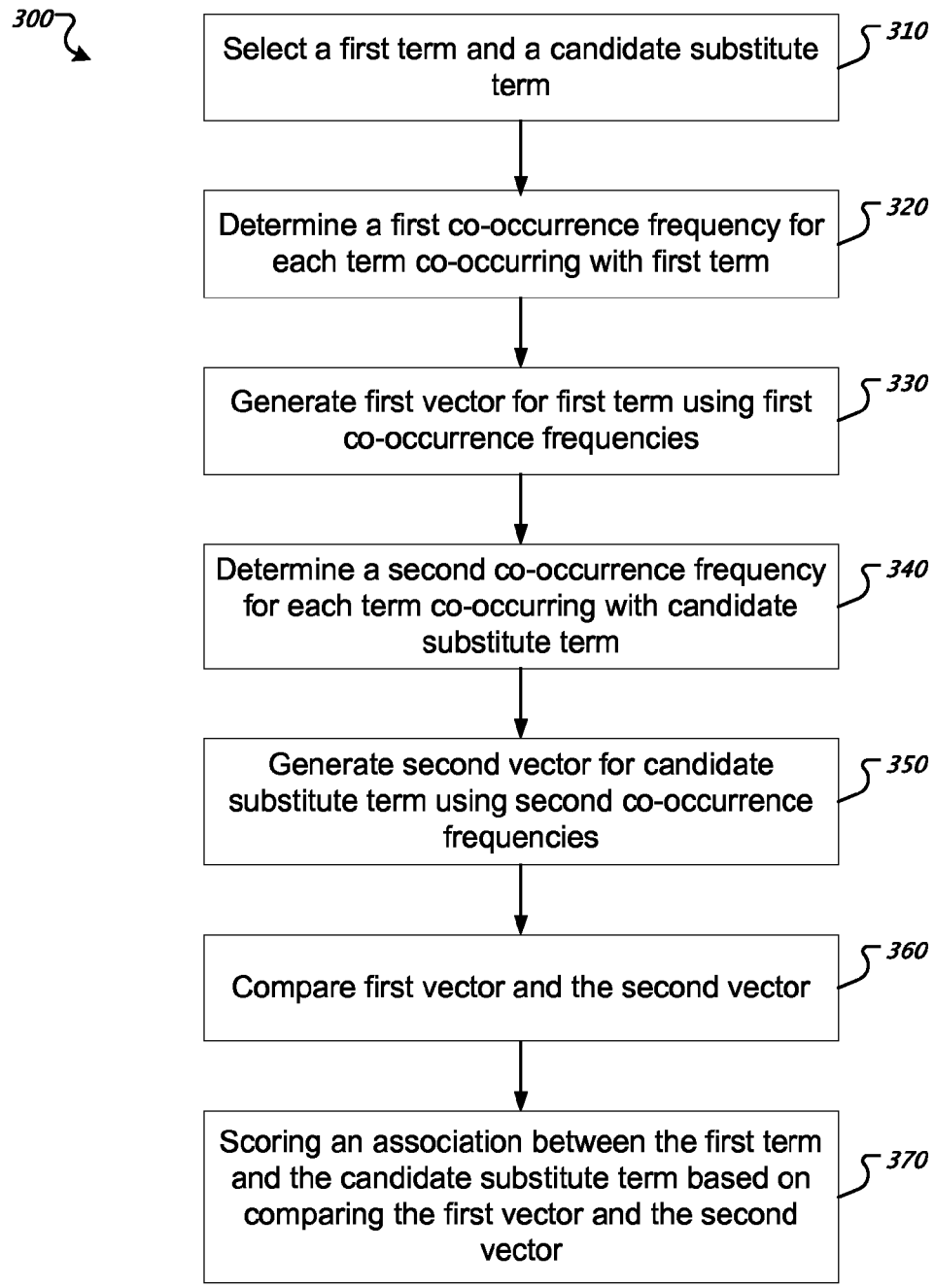
FIG. 3 is a flow chart of an example process for evaluating substitute terms using vectors.

FIG. 3 is a flow chart of an example process 300 for evaluating substitute terms using vectors. In general, the process 300 compares two vectors to determine whether a candidate substitute term is an appropriate substitution for a query term. The process will be described as being performed by a computer system of one or more computers, for example, the search system shown in FIG. 1.

The system selects a first term and a candidate substitute term (310). In some implementations, the first term and the candidate substitute term can be part of an existing substitution rule under evaluation. In some other implementations, the first term and candidate substitute term can be received from the output of a "break and join" process that attempts to identify whether an original term and a phrase that is the original term broken into multiple parts should be considered substitute terms. Similarly, the "break and join" process can attempt to identify whether a phrase of multiple terms and the multiple terms joined into one term should be considered substitute terms. For example, the terms "French open" and "Frenchopen" can be received from the output of a "break and join" process for evaluation as substitute terms.

In some implementations, the system decides not to evaluate the first term and the candidate substitute term if a confidence score for an existing substitution rule is particularly strong. For example, for the first term "run" and the candidate substitute term "runs," the system can skip evaluating the two terms with vectors. In some implementations, the system evaluates a first term and a candidate substitute term using vectors only if a confidence score for the corresponding substitution rule meets a particular threshold.

The system determines a first co-occurrence frequency for each term co-occurring with the first term in search queries (320). The system can compute the co-occurrence frequencies in a variety of ways. For example, the system can count the number of times each term co-occurred with the first term in the received search queries and divide the count by the number of queries that included the first term or by the total number of queries.

The system generates a first vector for the first term using the first co-occurrence frequencies (330). Each value of the first vector can be a computed co-occurrence frequency of a particular term that co-occurred with the first term. The first vector can also include a respective co-occurrence frequency value for one or more terms that only co-occurred with the candidate substitute term.

In some implementations, the system can filter out particular co-occurrence frequency values before or while generating the vectors. For example, some terms co-occur in queries with an unusually high frequency, e.g. "star" and "wars" in the query "star wars." Therefore, if the system is evaluating "star" as either an original term or a substitute term, the system can discard the co-occurrence frequency value for the term "wars."

The system determines a second co-occurrence frequency for each term co-occurring with the candidate substitute term in received search queries (340). The system generates a second vector for the candidate substitute term using the second co-occurrence frequencies (350). Each value of the second vector for the candidate substitute term can be a computed co-occurrence frequency of a particular term that co-occurred with the candidate substitute term. The second vector can also include a respective value for one or more terms that only co-occurred with the first term.

The system compares the first vector and the second vector (360). In some implementations, the system compares the vectors by computing a vector similarity measure between the first vector and the second vector. The system can for example compute a cosine similarity between two vectors A and B as:

$$\text{similarity} = \frac{\sum_{i=1}^{n} A_i * B_i}{\sqrt{\sum_{i}^{n}(A_i)^2} * \sqrt{\sum_{i}^{n}(B_i)^2}},$$

for vectors of length n. Other similarity measures can be used instead of cosine similarity.

The system scores an association between the first term and the candidate substitute term based on comparing the first vector and the second vector (370). The system can use the computed similarity measure to compute a measure of confidence for a substitution rule for the first term and the candidate substitute term. For example, if the computed similarity measure satisfies a threshold, the system can increase the confidence score for the substitution rule. If the computed similarity measure does not satisfy the threshold, the system can decrease the confidence score for the substitution rule or eliminate the substitution rule altogether.

FIG. 4 is a diagram of evaluating query contexts using vectors. Substitution rules for an original term and a substitute term often have an associated context. The context provides one or more terms that must occur before or after the original term in a search query before the substitution rule will apply. From the example in FIG. 1, a substitution rule can specify that "pet" is a substitute term for "dog," but only when "dog" is followed by "food" in a search query. A particular context notation indicates this substitution rule as dog→pet (:food), where the colon ":" indicates a placeholder for the term/substitute-term transition.

Substitution rule contexts can provide additional semantic meaning, which makes query revisions more accurate. For example, the term "ship" can have significantly different meanings for the queries "ship wreck" and "ship package." In these cases, having two different context-specific substitution rules, e.g. ship→boat (:wreck) and ship→send (:package) can improve the quality and accuracy of query revisions.

However, some contexts identified by a substitute term engine for substitution rules may not add additional meaning for a substitution rule. For example, a substitute term engine may identify both (1) the general context substitution rule ship→boat, as well as (2) the context-specific substitution rule ship→boat (the:)—in other words, substitute "boat" for "ship" when "ship" is preceded by "the." The context (the:) for ship→boat does not add significant meaning to the original term "ship." Having both rules in the system can result in skewed or duplicative statistics for a substitute term engine. Therefore, the substitute term engine can evaluate contexts with vectors to determine which contexts are most helpful and eliminate contexts that are unhelpful. In other words, the substitution engine can eliminate contexts that do not add significant additional semantic meaning for a substitution rule.

A search system can evaluate the particular contexts using vectors populated using statistics of terms that co-occur with an original term or co-occur with an original term in a particular context in received search queries. For example, in FIG. 4 the search system can evaluate the context (:music) for the substitution rule sheer→sheet. In other words, the search system can use vectors to determine whether the context (:music) is a helpful context for the substitution rule sheer→sheet. Intuitively, (:music) may be a helpful context for sheer→sheet because the substitution rule sheer→sheet may not apply generally, but the rule can serve to correct a common typographical error (i.e. "sheer music" instead of "sheet music") in a revised search query when "sheer" is followed by "music."

Similarly, in FIG. 4 the search system can evaluate the context (:the) for the substitution rule train→bus. Intuitively, (:the) may not be a helpful context for train→bus because the definite article "the" used as a context may only rarely add additional semantic meaning, e.g. "The Who" or "The Hindu".

For a number of received search queries, e.g. example search queries 402, that include either the original query term, e.g. "sheer", or the original query term in the context under evaluation, e.g. "sheer music," the search system can compute statistics of terms 410 that co-occur in the received search queries 402.

The system can generate a first vector 404 that has elements corresponding to each term that co-occurs with the original query term or with the original query term occurring in the context under evaluation. Each value of the vector 404 can be a statistic, e.g. frequency, for a term that also appeared in a query that included "sheer music." The system can generate a second vector 406 that also has elements corresponding to each term that co-occurs with the original query term or with the original query term in the context under evaluation. Each value of the vector 406 can be a statistic for a term that also appeared in a query that included "sheer."

The search system can compare the two vectors to evaluate the context (:music). For example, the search system can take the difference between vector 404 and vector 406 to compute a delta vector 408. The search system can also order delta vector 408 in decreasing or increasing order of its element values.

After ordering the delta vector 408, the search system can evaluate co-occurring terms 410 that correspond to values in the delta vector. If the terms for the top N values in the delta vector 408 have more importance, the search system can determine that the context (:music) adds more significant semantic meaning when adjacent to the original query term in a search query. On the other hand, if the top N terms have less importance, the search system can determine that the context (:music) adds less significant semantic meaning when adjacent to the original query term in a search query.

For the context (the:), the search system can similarly populate vector 414 for original query term "train" in the context (the:) with statistics, e.g. co-occurrence frequencies, of terms that co-occur with the original query term in the context in received search queries 412. In other words, the search system computes statistics for terms that also occur in queries that include "the train." Vector 416 is similarly populated, but for terms that also occur in queries that include the original term "train." The delta vector 418 is computed using the difference between vector 414 and 416.

Delta vector 418 can be ordered in decreasing or increasing order to evaluate co-occurring terms 420 that correspond to values in the delta vector 410. The search system can then evaluate the importance of the terms for the top N values in the delta vector 418 to evaluate the context (the:).

The top N values, e.g. when N is 4, in delta vector 410 are "instrument," "store," "lessons," and "piano." In comparison, the top four values in delta vector 418 are "take," "where," "how," and "when." The search system can determine that "instrument," "store," "lessons," and "piano" have more importance than "take," "where," "how," and "when," and therefore determine that (:music) is a good context for substitution rule sheer→sheet, and that (the:) is a bad context for the substitution rule train→bus.

Figure 5:
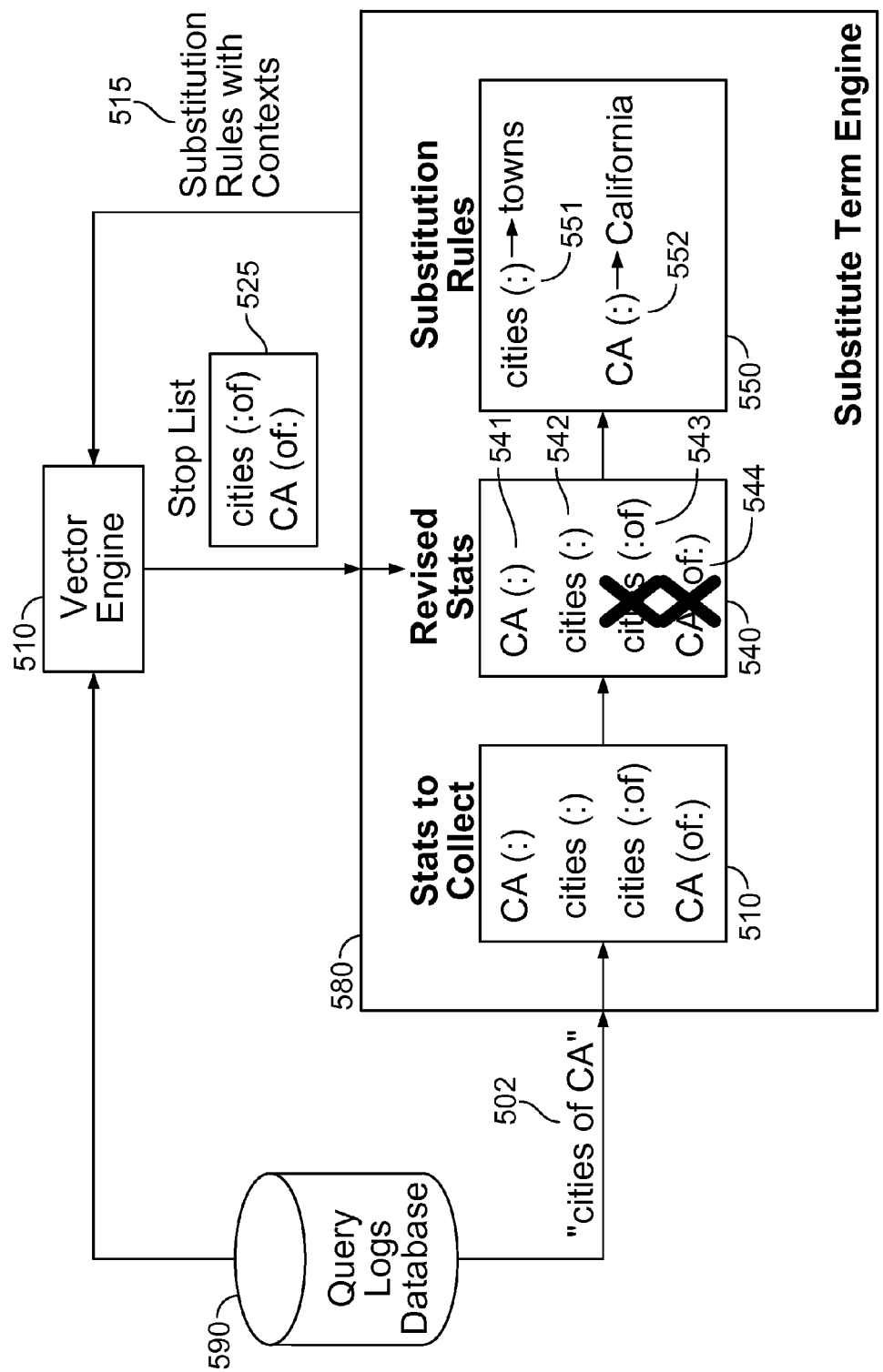
FIG. 5 is a diagram of an example system that uses a vector engine to evaluate contexts.

FIG. 5 is a diagram of an example system that uses a vector engine 510 to evaluate contexts. In general, the vector engine 510 evaluates contexts for substitution rules and provides a stop list 525 containing bad contexts to a substitute term engine 580.

Both the substitute term engine 580 and the vector engine 510 can access queries stored in a query log database 590. The vector engine 510 receives a list 515 of substitution rules and associated contexts for evaluation. The vector engine 510 then analyzes data in the query log database 590 to determine which of the contexts is a bad context. The vector engine 510 then provides a stop list 525 containing the bad contexts to the substitute term engine 580.

The substitute term engine 580 uses the stop list 525 to eliminate candidate substitution rules, resulting in a smaller data size and less data to process. For a particular query 502 from the query logs database 590, the substitute term engine 580 determines a number of original query terms that can be the basis of candidate substitution rules. For example, for the query "cities of CA" 502, the substitute term engine 580 identifies "CA" in the general context (:), "cities" in the general context (:), "cities" in the context (:of), and "CA" in the context (of:). For each of these candidate substitution rules, the substitute term engine 580 can compute statistics in order to identify a substitute term for each rule. For example, after computing statistics, the substitute term engine can determine that "towns" is a substitute term for "cities," and that "California" is a substitute term for "CA."

The substitute term engine 580 receives stop list 525, which indicates that the context (:of) is a bad context for candidate substitution rule for "cities" and that the context (of:) is a bad context for the candidate substitution rule for "CA." Accordingly, the substitute term engine removes candidate substitution rules 543 and 544, leaving candidate substitution rules 541 and 542 for analysis. After computing statistics for candidate substitution rules 541 and 542, the substitute term engine 580 can determine substitution rule 551, cities→towns (:) in the general context and substitution rule 552, CA→California (:) in the general context.

Figure 6:
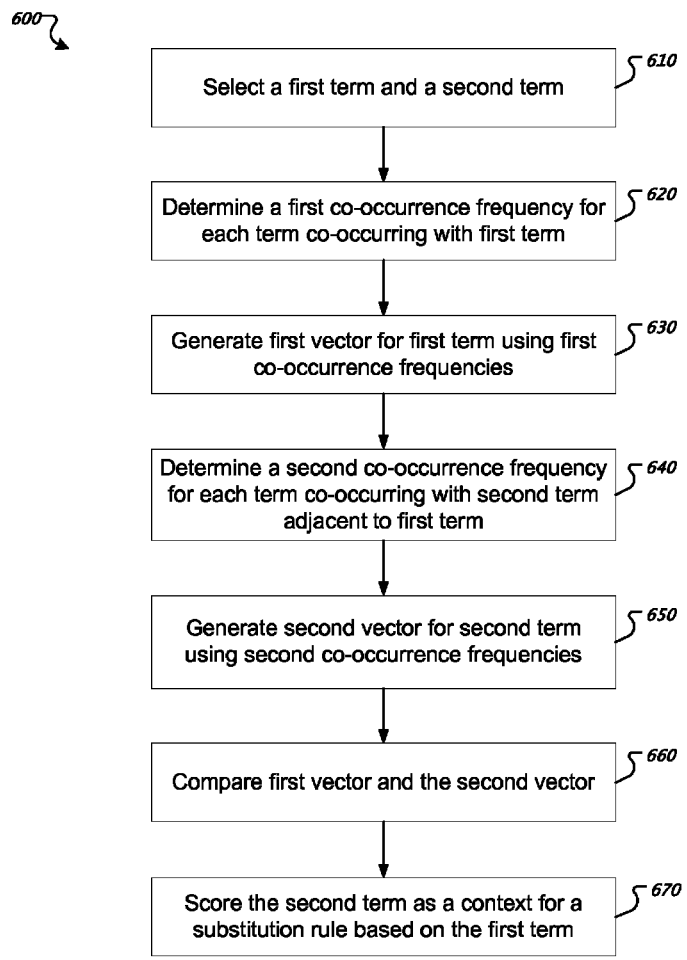
FIG. 6 is a flow chart of an example process for evaluating a context using vectors.

FIG. 6 is a flow chart of an example process 600 for evaluating a context using vectors. In general, the process 600 compares two vectors to determine whether a second term is a good context for a substitution rule based on a first term. The process will be described as being performed by a computer system of one or more computers, for example, the search system shown in FIG. 1.

The system selects a first term and a second term (610). In some implementations, the first term and the second term are part of an existing substitution rule in which the first term is the original term of the substitution rule and the second term specifies a context for the substitution rule to apply. For example, for the substitution rule the first term sheer→sheet (:music), the first term can be "sheer" and the second term can be "music." In some other implementations, the system can select the original term and context term from candidate substitution rules under evaluation.

The system determines a first co-occurrence frequency for each term co-occurring with the first term in received search queries (620). The system generates a first vector for the first term using the first co-occurrence frequencies (630).

The system determines a second co-occurrence frequency for each term co-occurring with the second term adjacent to the first term in received search queries (640). The context of a particular substitution rule can specify whether the second term is before or after the first term in a search query. For example, for the substitution rule sheer→sheet (:music), the system can compute statistics for "piano" in the query "piano sheer music" because the second term, "music," occurred after "sheer." However, the system would not compute statistics for "piano" if "music" occurred before "sheer."

The system generates a second vector for the second term using the second co-occurrence frequencies (650).

The system compares the first vector and the second vector (660). In some implementations, the system takes a difference between the first vector and the second vector to generate a delta vector, for example, delta vector 408 in FIG. 4. The values in the delta vector with the largest and smallest values indicate which co-occurring terms occurred more often with just the first term or with the first term in the context of the second term.

The system scores the second term as a context for a substitution rule based on the first term (670). After computing the delta vector, the system can order the delta vector in increasing or decreasing order and compute a score based on a number of highest or lowest values in the ordered delta vector. As mentioned above, the score can be based on the term importance of terms that correspond to the highest or lowest values in the ordered delta vector.

In some implementations, the system uses inverse document frequency, i.e. IDF, values as a measure of the importance of terms represented in the delta vector. The system can then weight the top N values in the delta vector by the IDF values for the corresponding terms to compute a score for the second term as a context. The score can be given by:

$$score = \sum_{i=1}^{N} V_i \cdot IDF(Term_i),$$

where $V_i$ is each value of the top N values of the ordered delta vector and IDF ($Term_i$) is the IDF value of the term corresponding to $V_i$. The computed score can then be compared to a threshold. If the score does not satisfy a particular threshold, e.g. 0.2, 0.8, 1.2, the second term can be designated as a bad context for a substitution rule based on the first term and the second term as a context. The first term and second term context can then be added to a stop list of bad contexts, for example, for use by a substitute term engine.

The system can compute the importance of terms represented in the delta vector in other ways as well. In some implementations, the system computes an importance score based on statistics of terms that co-occur with a term in received search queries. From FIG. 4, the top four values of delta vector 408 were "instrument," "store," "lessons," and "piano." For each term, the system can compute co-occurrence frequencies of all other terms that co-occurred with that term in received search queries. The co-occurrence frequencies can be used to generate a vector, H, and the importance score for a particular term can then be calculated as $$imp(x) = 1 - \sum_{i=1}^{k} H_i \cdot DF(Term_i),$$

where $H_i$ is each value of all k values in the vector H, and DF ($Term_i$) is the document frequency value of the term corresponding to $H_i$.

After computing the importance score for each term, the system can then weight the top N values in the delta vector by the importance score for the corresponding terms to compute a score for the second term as a context. The score can be given by $$score = \sum_{i=1}^{N} V_i \cdot imp(Term_i),$$

where $V_i$ is each value of the top N values of the ordered delta vector and imp($Term_i$) is the computed importance score of the term corresponding to $V_i$. If the computed score does not satisfy a threshold, the second term can be designated as a bad context for a substitution rule based on the first term and the second term as a context. The first term and second term context can then be added to a stop list of bad contexts, for example, for use by a substitute term engine in removing bad contexts from the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    selecting a first term and a second term;
    determining, for each of one or more first co-occurring terms that occur in past search queries that include the first term, a first co-occurrence frequency of the co-occurring term in search queries that include the first term;
    generating a first vector for the first term using the first co-occurrence frequencies;
    determining, for each of one or more second co-occurring terms that occur in past search queries that include the first term adjacent to the second term, a second co-occurrence frequency of the co-occurring term in the search queries that include the first term adjacent to the second term;
    generating a second vector for the second term using the second co-occurrence frequencies;
    comparing the first vector and the second vector; and
    computing a score for the second term as a context for a substitution rule based on the first term, wherein the score is based on a comparison between the first vector and the second vector.

2. The method of claim 1, wherein computing a score for the second term comprises:
    computing respective changes in co-occurrence frequency between corresponding elements of the first vector and the second vector;
    generating an order of co-occurring terms according to the corresponding computed changes in co-occurrence frequency; and
    computing a measure of importance of a top number of co-occurring terms in the order.

3. The method of claim 2, wherein the score increases as the measure of importance of the top number of co-occurring terms increases.

4. The method of claim 2, wherein computing a score for the second term comprises:
    computing a weighted sum of the changes in co-occurrence frequencies for the top number of co-occurring terms in the order, wherein each change in co-occurrence frequency is weighted by the measure of importance of the corresponding co-occurring term.

5. The method of claim 4, wherein the score satisfies:

$$\text{score} = \sum_{i=1}^{N} V_i \cdot imp(\text{Term}_i),$$

wherein $V_i$ is a change in co-occurrence frequency Term$_i$ is a term corresponding to the change in co-occurrence frequency, and $imp(\text{Term}_i)$ is an importance of Term$_i$.

6. The method of claim 2, wherein the measure of importance for a term x is based on frequencies of terms that co-occur with the term in received search queries, and is given by:

$$imp(x) = 1 - \sum_{i=1}^{k} H_i \cdot DF(\text{Term}_i),$$

wherein $H_i$ is a co-occurrence frequency value for Term$_i$ and $DF(\text{Term}_i)$ is a document frequency value of Term$_i$.

7. The method of claim 2, wherein the measure of importance of a term is an inverse document frequency of the term.

8. The method of claim 2, wherein the measure of importance of a term is computed by:
    determining terms that co-occur with the term in received search queries;
    computing an inverse document frequency of each term that co-occurs with the term in received search queries; and
    computing the measure of importance based at least in part on a sum of the computed inverse document frequency of each term that co-occurs with the term in received search queries.

9. The method of claim 1, wherein the first term and the second term occur in a substitution rule that specifies a query revision that applies when the first term occurs adjacent to the second term.

10. The method of claim 1, comprising:
    determining that the score satisfies a threshold; and
    designating the second term as a bad context for the first term in response to determining that the score satisfies a threshold.

11. The method of claim 10, wherein designating the second term as a bad context for the first term comprises adding the context to a stop list of bad contexts.

12. The method of claim 11, comprising:
    providing the stop list to a query revision process that will ignore substitution rules that depend on bad contexts in the stop list.

13. A system comprising:
    one or more computers and one or more storage devices storing instructions that, when executed by the one or more computers, cause the one or more computers to perform operations comprising:
    selecting a first term and a second term;
    determining, for each of one or more first co-occurring terms that occur in past search queries that include the first term, a first co-occurrence frequency of the co-occurring term in search queries that include the first term;
    generating a first vector for the first term using the first co-occurrence frequencies;
    determining, for each of one or more second co-occurring terms that occur in past search queries that include the first term adjacent to the second term, a second co-occurrence frequency of the co-occurring term in the search queries that include the first term adjacent to the second term;
    generating a second vector for the second term using the second co-occurrence frequencies;
    comparing the first vector and the second vector; and
    computing a score for the second term as a context for a substitution rule based on the first term, wherein the score is based on a comparison between the first vector and the second vector.

14. The system of claim 13, wherein computing a score for the second term comprises:
    computing respective changes in co-occurrence frequency between corresponding elements of the first vector and the second vector;
    generating an order of co-occurring terms according to the corresponding computed changes in co-occurrence frequency; and
    computing a measure of importance of a top number of co-occurring terms in the order.

15. The system of claim 14, wherein the score increases as the measure of importance of the top number of co-occurring terms increases.

16. The system of claim 14, wherein computing a score for the second term comprises:
computing a weighted sum of the changes in co-occurrence frequencies for the top number of co-occurring terms in the order, wherein each change in co-occurrence frequency is weighted by the measure of importance of the corresponding co-occurring term.

17. The system of claim 16, wherein the score satisfies:

$$\text{score} = \sum_{i=1}^{N} V_i \cdot imp(\text{Term}_i),$$

wherein $V_i$ is a change in co-occurrence frequency Term$_i$ is a term corresponding to the change in co-occurrence frequency, and imp(Term$_i$) is an importance of Term$_i$.

18. The system of claim 14, wherein the measure of importance for a term x is based on frequencies of terms that co-occur with the term in received search queries, and is given by:

$$imp(x) = 1 - \sum_{i=1}^{k} H_i \cdot DF(\text{Term}_i),$$

wherein $H_i$ is a co-occurrence frequency value for Term$_i$ and DF(Term$_i$) is a document frequency value of Term$_i$.

19. The system of claim 14, wherein the measure of importance of a term is an inverse document frequency of the term.

20. The system of claim 14, wherein the measure of importance of a term is computed by:
determining terms that co-occur with the term in received search queries;
computing an inverse document frequency of each term that co-occurs with the term in received search queries; and
computing the measure of importance based at least in part on a sum of the computed inverse document frequency of each term that co-occurs with the term in received search queries.

21. The system of claim 13, wherein the first term and the second term occur in a substitution rule that specifies a query revision that applies when the first term occurs adjacent to the second term.

22. The system of claim 13, wherein the operations further comprise:
determining that the score satisfies a threshold; and
designating the second term as a bad context for the first term in response to determining that the score satisfies a threshold.

23. The system of claim 22, wherein designating the second term as a bad context for the first term comprises adding the context to a stop list of bad contexts.

24. The system of claim 23, wherein the operations further comprise:
providing the stop list to a query revision process that will ignore substitution rules that depend on bad contexts in the stop list.

25. A non-transitory computer-readable medium storing software comprising instructions executable by one or more computers which, upon such execution, cause the one or more computers to perform operations comprising:
selecting a first term and a second term;
determining, for each of one or more first co-occurring terms that occur in past search queries that include the first term, a first co-occurrence frequency of the co-occurring term in search queries that include the first term;
generating a first vector for the first term using the first co-occurrence frequencies;
determining, for each of one or more second co-occurring terms that occur in past search queries that include the first term adjacent to the second term, a second co-occurrence frequency of the co-occurring term in the search queries that include the first term adjacent to the second term;
generating a second vector for the second term using the second co-occurrence frequencies;
comparing the first vector and the second vector; and
computing a score for the second term as a context for a substitution rule based on the first term, wherein the score is based on a comparison between the first vector and the second vector.

26. The computer-readable medium of claim 25, wherein computing a score for the second term comprises:
computing respective changes in co-occurrence frequency between corresponding elements of the first vector and the second vector;
generating an order of co-occurring terms according to the corresponding computed changes in co-occurrence frequency; and
computing a measure of importance of a top number of co-occurring terms in the order.

27. The computer-readable medium of claim 26, wherein the score increases as the measure of importance of the top number of co-occurring terms increases.

28. The computer-readable medium of claim 26, wherein computing a score for the second term comprises:
computing a weighted sum of the changes in co-occurrence frequencies for the top number of co-occurring terms in the order, wherein each change in co-occurrence frequency is weighted by the measure of importance of the corresponding co-occurring term.

29. The computer-readable medium of claim 28, wherein the score satisfies:

$$\text{score} = \sum_{i=1}^{N} V_i \cdot imp(\text{Term}_i),$$

wherein $V_i$ is a change in co-occurrence frequency Term$_i$ is a term corresponding to the change in co-occurrence frequency, and imp(Term$_i$) is an importance of Term$_i$.

30. The computer-readable medium of claim 26, wherein the measure of importance for a term x is based on frequencies of terms that co-occur with the term in received search queries, and is given by:

$$imp(x) = 1 - \sum_{i=1}^{k} H_i \cdot DF(\text{Term}_i),$$

wherein $H_i$ is a co-occurrence frequency value for Term$_i$ and DF(Term$_i$) is a document frequency value of Term$_i$.

31. The computer-readable medium of claim 26, wherein the measure of importance of a term is an inverse document frequency of the term.

32. The computer-readable medium of claim 26, wherein the measure of importance of a term is computed by:
   determining terms that co-occur with the term in received search queries;
   computing an inverse document frequency of each term that co-occurs with the term in received search queries; and
   computing the measure of importance based at least in part on a sum of the computed inverse document frequency of each term that co-occurs with the term in received search queries.

33. The computer-readable medium of claim 25, wherein the first term and the second term occur in a substitution rule that specifies a query revision that applies when the first term occurs adjacent to the second term.

34. The computer-readable medium of claim 25, wherein the operations further comprise:
   determining that the score satisfies a threshold; and
   designating the second term as a bad context for the first term in response to determining that the score satisfies a threshold.

35. The computer-readable medium of claim 34, wherein designating the second term as a bad context for the first term comprises adding the context to a stop list of bad contexts.

36. The computer-readable medium of claim 35, wherein the operations further comprise:
   providing the stop list to a query revision process that will ignore substitution rules that depend on bad contexts in the stop list.

* * * * *